United States Patent
Pardikes

[11] Patent Number: 5,879,080
[45] Date of Patent: Mar. 9, 1999

[54] DRY POLYMER PROCESSING SYSTEM

[76] Inventor: Dennis G. Pardikes, 12811 S. 82nd St., Palos Park, Ill. 60464

[21] Appl. No.: 673,495

[22] Filed: Jul. 1, 1996

Related U.S. Application Data

[63] Continuation-in-part of Ser. No. 522,842, Sep. 1, 1995, Pat. No. 5,599,101.

[51] Int. Cl.$^6$ .................................................. B01F 15/02
[52] U.S. Cl. ..................................... 366/165.1; 366/178.1
[58] Field of Search ................................ 366/138, 165.1, 366/165.2, 165.3, 165.4, 165.5, 166.1, 155.1, 155.2, 178.1

[56] References Cited

U.S. PATENT DOCUMENTS

| | | | |
|---|---|---|---|
| 3,804,303 | 4/1974 | Fassauer | 366/155.1 |
| 3,840,213 | 10/1974 | Kormos | 366/155.1 |
| 4,175,873 | 11/1979 | Iwako et al. | 366/165.3 |
| 4,184,771 | 1/1980 | Day | 366/165.4 |
| 4,511,256 | 4/1985 | Karg et al. | 366/165.3 |
| 4,750,843 | 6/1988 | Endtner et al. | 366/165.3 |
| 4,778,280 | 10/1988 | Brazelton | 366/165.4 |
| 5,284,626 | 2/1994 | Brazelton et al. | 366/138 |
| 5,344,233 | 9/1994 | Barger | 366/165.3 |
| 5,599,101 | 2/1997 | Pardikes | 366/165.1 |

Primary Examiner—Tony G. Soohoo
Attorney, Agent, or Firm—Laff, Whitesel, Conte & Saret, Ltd.

[57] ABSTRACT

A low cost dry polymer processing system has a housing containing submersible pump with a weir mounted on top of the housing and over an impeller chamber in the housing. The weir is a combination of a sleeve and a coaxial funnel with a top edge of the funnel that is level with respect to gravity to the extent that an inside wall of the funnel is wetted with an unbroken sheet of liquid. An electrolyte liquid rising in the sleeve overflows the top edge of the funnel in order to form a liquid sheet or curtain uniformly covering the inside wall of the funnel. The amount of liquid is limited so that the impeller is not hydraulically locked. Dry polymer is dropped through the funnel and into the eye of the impeller enclosed within the chamber which is drained via a port in the bottom of the pump housing. Fresh electrolyte is introduced into the housing at a level which is under the impeller. Thereafter, the mixture of the electrolyte and polymer is drained from the impeller compartment via the port. Before the mixture is completely discharged from the housing, another supply of fresh electrolyte is introduced into the draining mixture.

14 Claims, 5 Drawing Sheets

DRY POLYMER PROCESSING SYSTEM

This is a continuation-in-part of Ser. No. 08/522,842, filed Sep. 1, 1995, now U.S. Pat. No. 5,599,101.

This invention relates to dry polymer processing systems and more particularly to low cost systems for processing dry, dense polymer at either a low or high volume.

For convenience of expression, the terms "water" or "liquid" are used hereinafter to describe all suitable electrolytes that may be used to process dry polymer. The terms "water" or "liquid" should be construed broadly enough to include any liquid suitable for wetting dry polymer.

A characteristic of dry polymer is that it is very coarse and difficult to properly wet. The mixture of water and polymer forms an abrasive material which tends to grind away at bearings, seals, and the like. Therefore, if conventional polymer hydrating or activating techniques are used, there is a mechanical action almost like trying to stir sand with an impeller. This action leads to a great number of serious problems such as erosion or a build-up of debris on shaft seals, damage to associated equipment, and the like.

Since the conventional way of mounting an impeller is to put it on the shaft of a motor, and further, since the impeller is operated in a horizontal position, the motor is generally directly below the impeller. As the abrasive material erodes and eats its way through the metal and seals, the motor is attacked by the abrasive water and polymer dripping from the impeller shaft seal. As a result, prior art machines have often failed after only a few months in the field.

This problem of early motor failure has led to machines which place the motor at a location remote from the impeller with a pulley and belt system for applying the torque from the motor to turn the impeller. While this physical isolation did help the motor wear problems, it only transferred the wear problems from the motor to the pulley and belt system, with an unusually high maintenance cost required for a more frequent replacement of the belts, pulleys, bearings, and the like.

In order to solve the problem of motor failure, it might be thought that a wash down duty motor might be used. This type of motor has a housing with means for draining away surface water. For example, such a motor might be used in a car wash where any water falling on the motor runs out a drain in the bottom of a motor housing and does not reach the motor bearings.

While a wash down duty motor is adequate for some uses, it does nothing to solve problems brought about by hostile environments having excessively high humidity, that might, for example, be found in tropical rain forests or certain industrial areas such as mines, paper mills, and the like. In these hostile environments, the atmosphere is near saturation. Thus, the motor should be sealed against entry of substantially any water or moisture, hereinafter called "hermetically sealed", for convenience of expression.

Another reason for a hostile environment is the highly corrosive state of the polymer in a water solution. Depending upon the species (charge) of the polymer, the resulting solution pH can be an acid or a base. Therefore, it is also desirable to prevent substantially all corrosive materials from any contact with the internal parts of the motor housing, armature, bearings, etc. Thus, there are other and special reasons why the motor should be hermetically sealed.

Reference is made to my U.S. Pat. No. 5,407,975 for a disclosure of a relatively large system for processing high volumes of dry polymer at relatively high solution concentrations. My patent describes a system for placing the polymer in a more liquid state by bubbling air through the polymer solution. This system has solved most of the practical problems of hydrating or activating dry polymer. However, this patented system is a relatively large one adapted to process very large amounts of polymer. Therefore, it is both too large and too expensive for the small to mid-size user which processes only limited amounts of polymer at any given time. There is no clear boundary between large and small amounts of polymer; however, to give an example for convenience of description, a small scale user might process less than 500 pounds of dry polymer per day while a user of the system described in U.S. Pat. No. 5,407,975 might process more than 10,000 pounds per day.

Hence, the small to mid-size user has a pressing need for a low cost system for processing limited amounts of dense, dry polymer. It is not too important for the low cost system to have all of the features of the large system of my patent as long as the basic hydration or activation of polymer is carried out.

Another important consideration is to provide a small system with almost no maintenance cost. Such a low cost involves a use of as many standard commercial items as possible. For example, specially designed and built hermetically sealed motors would likely escalate the cost of a small system beyond the reach of many small system users.

I have learned that, with a proper application and use of the electrolyte, my small and low cost machine can match and exceed the capabilities of most large scale polymer processing systems while continuing to satisfy the needs of the small volume user.

Accordingly, an object of the invention is to provide a very low cost system for processing, not only limited, but also large amounts of coarse, dry polymer, and any suitable amount of polymer between these limited and large amounts.

In keeping with an aspect of the invention, an input to an impeller for the inventive system uses a weir to introduce dry polymer to an electrolyte. The polymer is dropped onto an eye of an impeller which is not hydraulically locked. The impeller completely wets the polymer with a minimum amount of electrolyte that is introduced by overflowing the weir. The pump is enclosed within a sleeve so that the electrolyte may flow over the pump housing and through the space between the motor and the sleeve. Jets of electrolyte are injected into such space both under the impeller and at the output port to increase the wetting process. Once the polymer is suitably wetted, it may be further processed in a fairly conventional manner. The wetting in the inventive device is complete enough to enable the aging step to be carried out by a mixing agitator, usually without requiring the bubbling air sometimes used in my prior patent.

In order to reduce the system costs by eliminating special machinery, I have found that it is possible to modify a standard high quality submersible pump to provide the necessary impeller action thereby eliminating the need for special parts without introducing the kind of motor/bearing wear problems which have haunted this kind of system in the past. The jets of electrolyte may be easily and simply injected by drilling holes in the submersible pump and installing fittings therein.

A preferred embodiment of the invention is shown in the attached drawings, in which.

Figure 1:
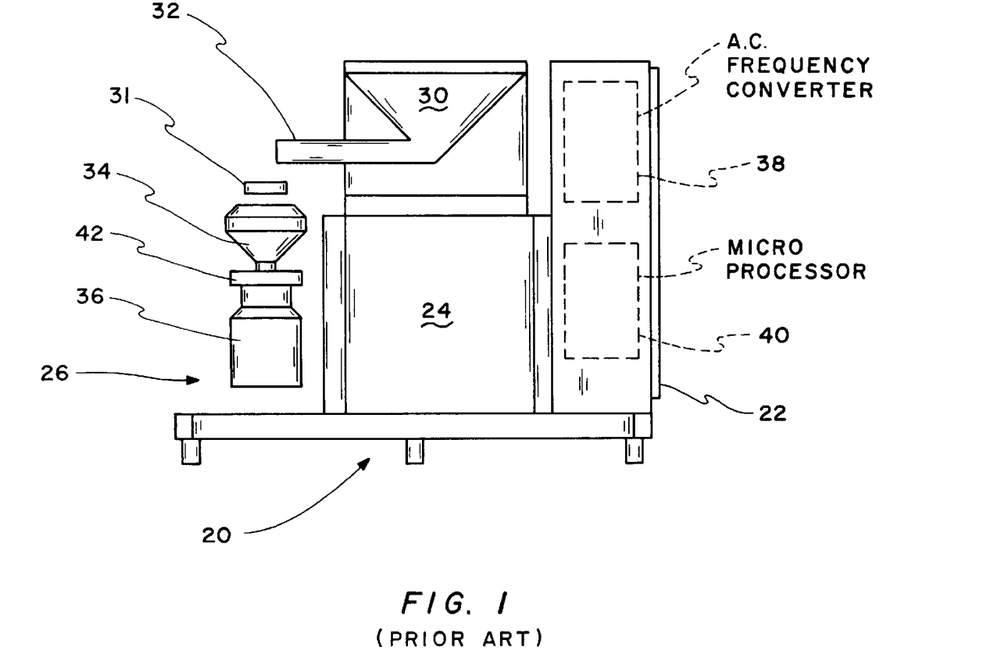
FIGS. 1–3 are prior art copied directly from FIGS. 2–4 of my U.S. Pat. No. 5,407,975; and more particularly, showing a schematic disclosure of a dry polymer activating system, and top and side views, respectively, of a funnel for introducing dry polymer to electrolyte.

As set forth in U.S. Pat. No. 5,407,975, FIG. 1 shows my prior dry polymer processing system 20 mounted on a single frame. The major components of this system are a control panel 22, a liquid handling section 24, a dry polymer processing system 26, a hopper 30 which is a source of dry polymer, non-contacting sensor 31, a dry polymer output port 32, a mixing container in the form of funnel 34, and a high speed disperser 36. The volumetric feeder at 30 is a standard commercial product. Any suitable shroud (not shown) may be provided to prevent the dry polymers represented by arrows 56 (FIGS. 2 and 3) from being dispersed over any area other than the entrance to the funnel 34.

To assure that dry polymer is flowing into the disperser 36, sensor 31 is located beneath the dry polymer output port 32 in order to "look" for an addition of dry polymer, at the appropriate time. The sensor 31 (FIG. 1) may be a photo-electric cell, a capacitance proximity sensor, or the like.

As shown in FIG. 1, control panel 22 includes a microprocessor 40 and an AC frequency converter 38 which provides a suitable power source for some of the equipment used in the system. The control panel 22 supplies the power required by the microprocessor and associated equipment. The microprocessor 40 operates all of the equipment that is in the system by controlling relays, valves, timing circuits, and the like, as required during the polymer processing.

The liquid handling system 24 receives the solution of dry polymer mixed with water that is the output of section 26. Once the dry polymer is so mixed into a solution, it becomes substantially the same as most liquid polymer which may be introduced into a suitable activating system.

Figure 2:
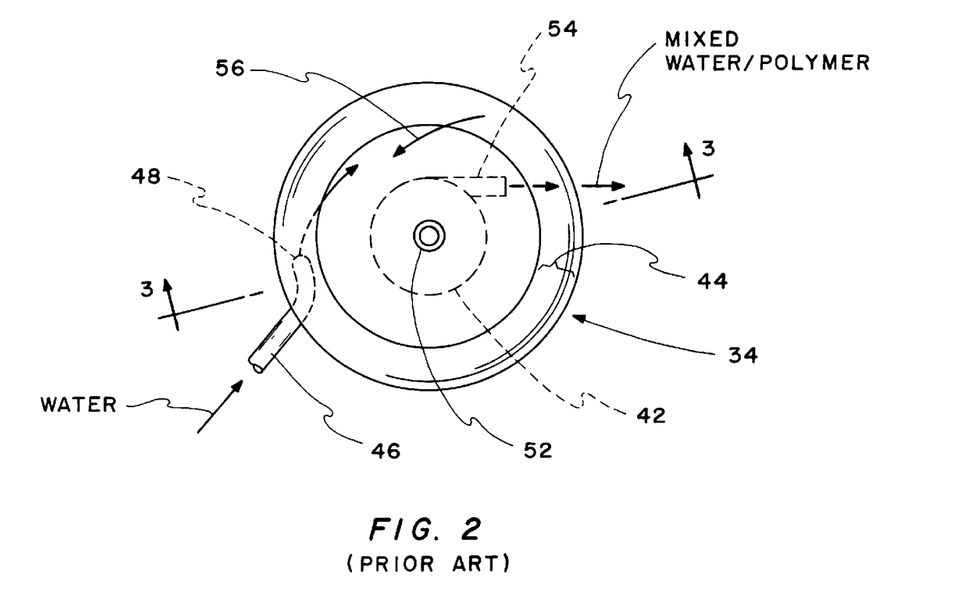
Figure 3:
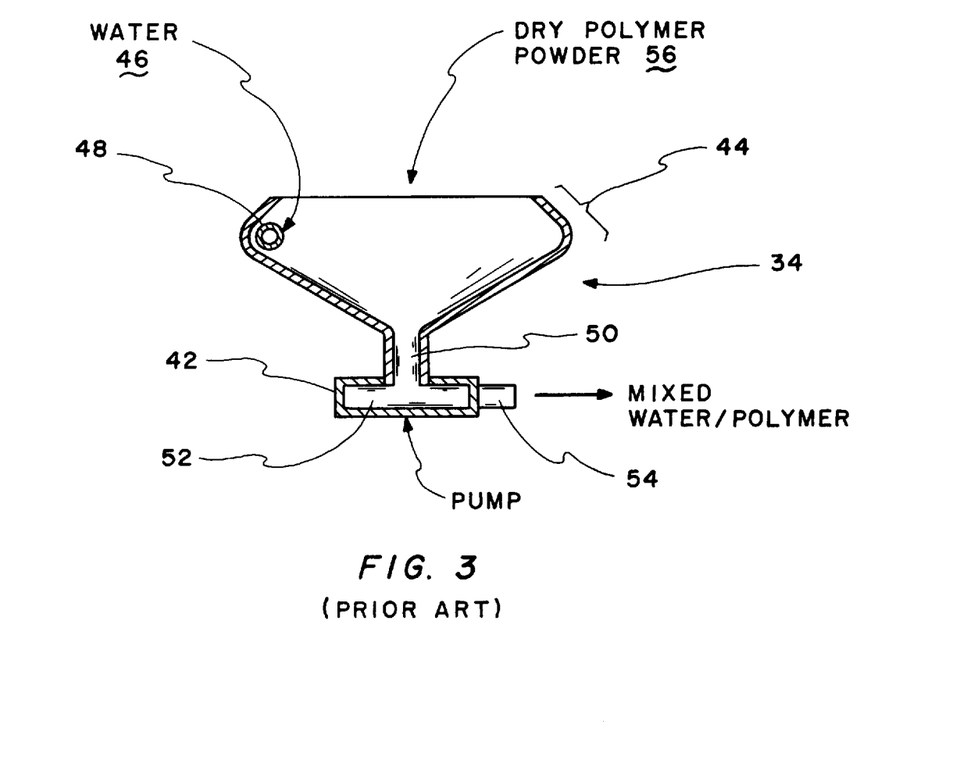

The construction of my prior mixing container or funnel feeder 34 is best shown in FIGS. 2 and 3. If any polymer falls upon a dry spot on the funnel wall, it may form "fish-eyes" or agglomerated particles that are difficult to break up. Therefore, there is a funnel with a turned in upper lip 44. Water is fed in through a somewhat L-shaped pipe 46 having an exit end 48 which dispenses the water circumferentially into an equatorial bulge between the funnel 34 and the upper lip 44. The water swirls around and wets the entire surface of the inside funnel wall and falls under gravity through the funnel spout 50 into the pump impeller. The funnel spout 50 opens directly into the eye or vortex 52 of a centrifugal pump 42.

One type of dry polymer particle flows under gravity from hopper 30 (FIG. 2) through pipe into the eye of the impeller. Any errant dry polymer dust particle falls on a sheet of fast moving water which uniformly wets the entire inside surface of funnel 36, thereby preventing the dry polymer from accumulating at any dry point on the funnel wall. As the water swirls into the vortex 52 of centrifugal pump 42, it receives a large amount of energy which is imparted by the impeller blades. This energy mixes the water and polymer with a uniformity, which is discharged through the output port 54 of pump 42. At this point, the water and polymer mixture becomes approximately the same as a fluid form of polymer.

The dispenser 32 delivers the dry polymer directly into the center of the disperser eye 52 of the centrifugal pump 42. Once in the disperser 36, the dry solid particles are instantaneously wetted while simultaneously being accelerated through the disperser chamber. In order to accomplish this, the disperser eye 52 of pump 42 is not completely immersed in water. The center portion of the spinning impeller element remains visible. That is, the water entering the disperser eye 52 from the funnel wall does not completely cover the impeller due to a combination of a controlled flow of water into the funnel and the centrifugal force imparted to the water by the disperser. Under these operating conditions, the disperser impeller does not become hydraulically locked. Consequently, the dry polymer has a direct pathway to the impeller due to the large amount of entrained air within the disperser 36 chamber.

The more expensive part of the system of FIG. 1 is the mechanical structure described thus far. Also, this structure performs the tasks which are the more difficult to accomplish. Therefore, it is highly desirable to duplicate the more critical of those tasks in a low cost manner, in order to give the low volume user a long sought production tool. Almost always, it is irrelevant to the low volume user whether or not such a low cost system can perform all of the tasks that can be performed by the large volume system described in my U.S. Pat. No. 5,407,975.

Heretofore, three principal problems have formed obstacles to such a low cost system, as follows: (a) the need to have a smooth and unbroken sheet of water on the interior wall of the funnel in order to avoid the fish eyes that occur if dry polymer is inadvertently dropped on a dry spot on the funnel wall; (b) the need to protect the motor beneath the impeller from the coarse and abrasive effects of the dry polymer eating away the bearings and seals which destroys the motor; and (c) the need to accomplish these tasks without requiring high cost specially designed and, therefore, expensive parts.

I have found that the best solution to these problems is provided by a modified submersible pump which is readily available at a relatively low cost. One example of such a submersible pump is sold under the trademark "GRUNDFOS" by the Grundfos Pump Corporation of 2555 Clovis Ave, Clovis, Calif. 93612. The pump body, motor, shaft, and impeller are made of stainless steel with a water lubricated motor which does not require oiling. The entire pump and motor can operate fully immersed without damage. "GRUNDFOS" says that its impeller is designed to resist build-up and to handle sand and solids up to three-eighths of an inch (1.9 cm) deep. "GRUNDFOS" reports that this particular submersible pump may be used to drain small excavations and therefore can withstand the grit, and the like, which is found under water in a newly dug hole in the ground. Of course, there are other standard commercial submersible pumps on the market which can be used according to my invention. Therefore, the appended claims should be construed broadly enough to cover all suitable submersible pumps, and the like.

The usual submersible pump has a suction screen at the bottom to admit water while keeping large objects out of the impeller inside the screen. The motor is above the impeller and is encased in a hermetically sealed chamber with bearings designed and protected to withstand the sand, grit, and other foreign matter. The impeller takes in surrounding water through the suction screen and drives the pumped water up a pipe and out a discharge port on the top of the submersible pump.

Figure 4:
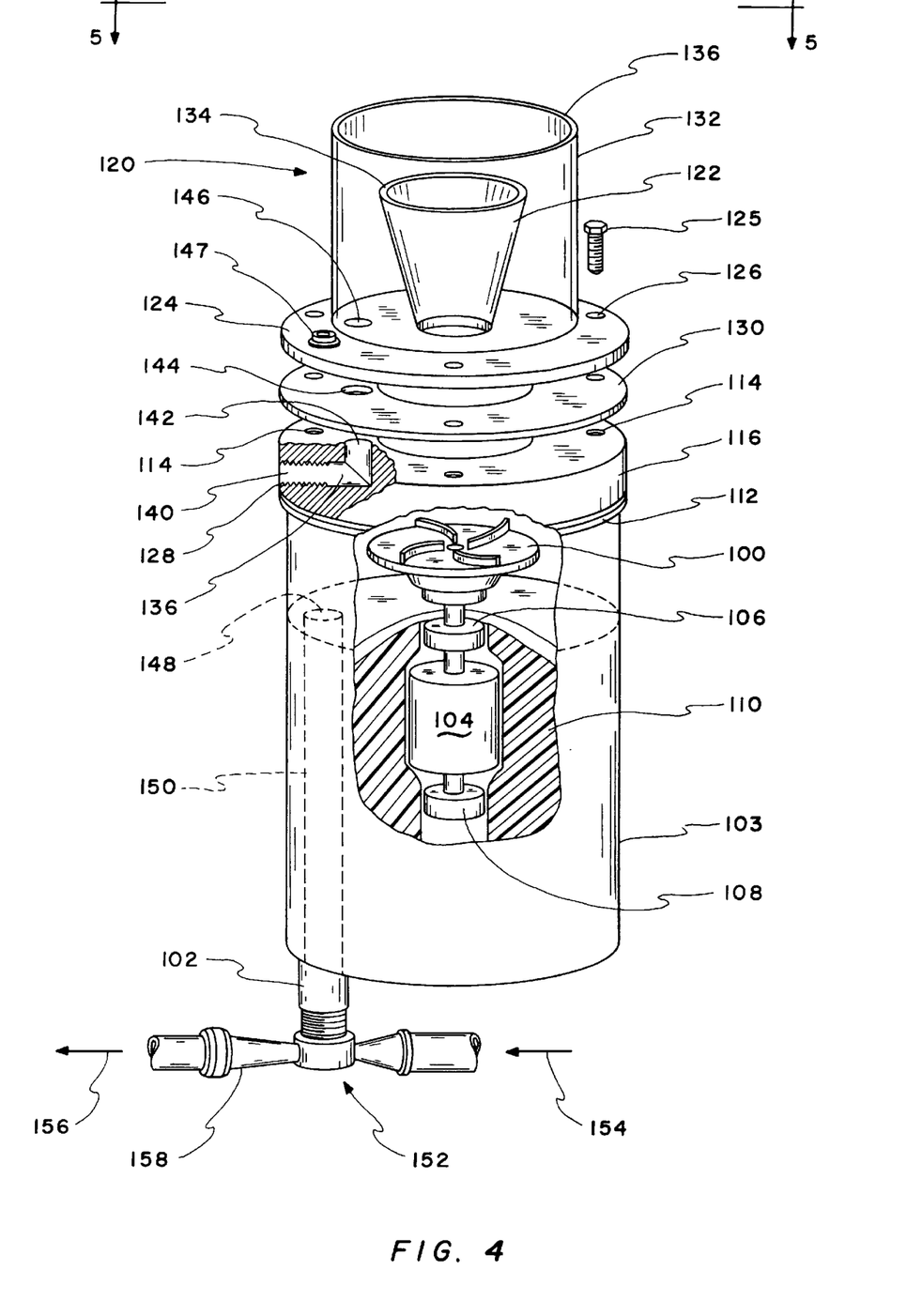
FIG. 4 is a perspective view showing how a quality submersible pump may be modified to convert the system of FIG. 1 into a low cost polymer processing system.

FIG. 4 shows the inventive modifications to a submersible pump, here the "GRUNDFOS" submersible pump; however, other submersible pumps may be modified in a similar manner. First, the pump is inverted to place the impeller 100 on top and the discharge pipe 102 on the bottom. The housing 103, motor 104 having a shaft 105 for mounting impeller 100, bearings 106, 108, and hermetic sealing material 110, along with other material structures relating to the water seal, are left untouched.

The suction screen is removed from the submersible pump housing 103, along with the pump volute plate, and discarded leaving the housing with a suitable seat 112 having bolt holes (not seen in FIG. 4) which are provided by the manufacturer for making an attachment of the suction screen to the housing body 103.

A collar 116 is manufactured with bolt holes 114 at locations which are in alignment with the bolt holes in the submersible pump seat 112 that were originally designed to secure the suction screen to the submersible pump housing 103.

A weir 120 is constructed to provide the unbroken curtain of water that coats the inside wall of a funnel 122 which introduces the dry polymer to the eye 123 of impeller 100. In FIG. 4, weir 120 has been drawn as if it is made of a clear and transparent material so that its construction can be seen. In reality, it is preferably constructed of stainless steel, or the like.

In greater detail, the weir has a base plate 124 with bolt holes 126 aligned with the bolt holes 114 in collar 116 and bolt holes on the seat 112 originally provided for attaching the suction screen onto the inverted submersible pump housing 103. Therefore, the collar 116 and base plate 124 may be attached to the submersible pump by passing bolts 125 through these aligned bolt holes. Suitable gaskets 128, 130 respectively seal the collar 116 to the submersible pump seat 112 and the base plate 124 to the collar 116.

Welded or otherwise attached to the top of base plate 124 are an upstanding funnel 122 and tubular sleeve 132. The funnel 122 is surrounded by the sleeve and co-axially therewith. The top edge 134 of funnel 122 is lower than the top edge 136 of sleeve 132.

An L-shaped passageway is formed in collar 116, leading from a threaded entrance opening 140 to an exit port 142 which is inside the perimeter of the sleeve 132 and outside the perimeter of funnel 122. A suitably placed hole 144 in the gasket 130 seals the output port 142 of the L-shaped passage way 136 to the entrance port 146 inside sleeve 132. Therefore, if water is introduced through threaded opening 140, the water will rise inside sleeve 132 until it reaches the level of the upper funnel edge 134. If the funnel edge is level with respect to gravity, water will spill over edge 134, uniformly around the periphery and uniformly covering the interior funnel wall. There is no need for special equipment for swirling the water in the funnel bowl. By adjusting the amount of water flow through opening 140, it is possible to precisely control the weir action.

Figure 4A:
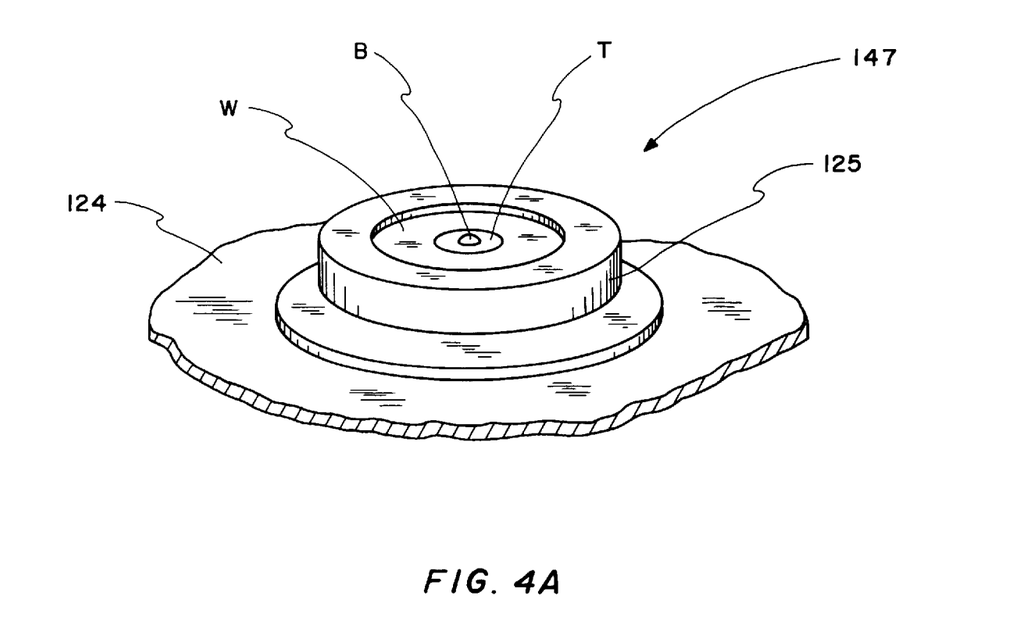
FIG. 4A is a fragmentary view taken from FIG. 4 and showing a level for aligning an upper edge of a weir.

A level 147 (FIG. 4A) is affixed to the base plate 124. This level is a conventional cylindrical chamber 125 which contains liquid with a bubble B and which has a circular target T imprinted on a transparent top window W. When the bubble B is centered in the target T the upper edge 136 of the funnel is level with respect to gravity.

Figure 5:
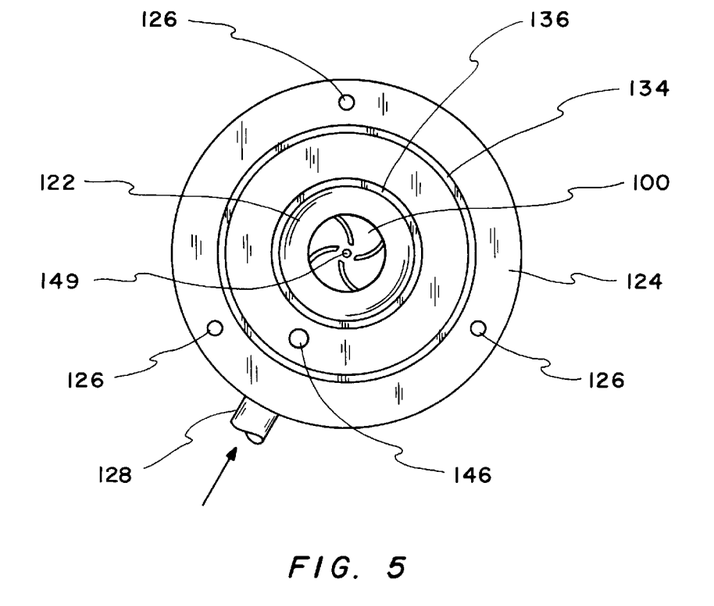
FIG. 5 is a plan view of the invention weir taken along line 5—5 of FIG. 4.

The rate of the inflow of water through hole 146 is adjusted so that the impeller does not become hydraulically locked. That is, the eye 149 (FIG. 5) of the impeller is open to air and is not filled with water. Also, since there is an almost fail safe guarantee of uniform wetting of the inside funnel wall a minimum amount of water is required as compared to the amount of water required by my patented system. This minimization of water consumption both reduces cost and simplifies the procedures by doing away with the need for eliminating the excess water.

The dry polymer is dropped into the eye 149 (FIG. 5) of the impeller 100 where it is uniformly mixed with the water. The mixture is discharged through a port 148 in the impeller chamber and down a discharge pipe 150 to the discharge port 102 at the bottom of the inverted submersible pump.

An eductor 152 is connected to the discharge port 102. The eductor is basically a venturi having an inflowing stream 154 of water which creates a low venturi pressure that helps pull the processed polymer from the impeller chamber and down pipe 150. The mixture of inflowing water 154 and the processed polymer in pipe 150 is discharged from eductor port 158.

Figure 7:
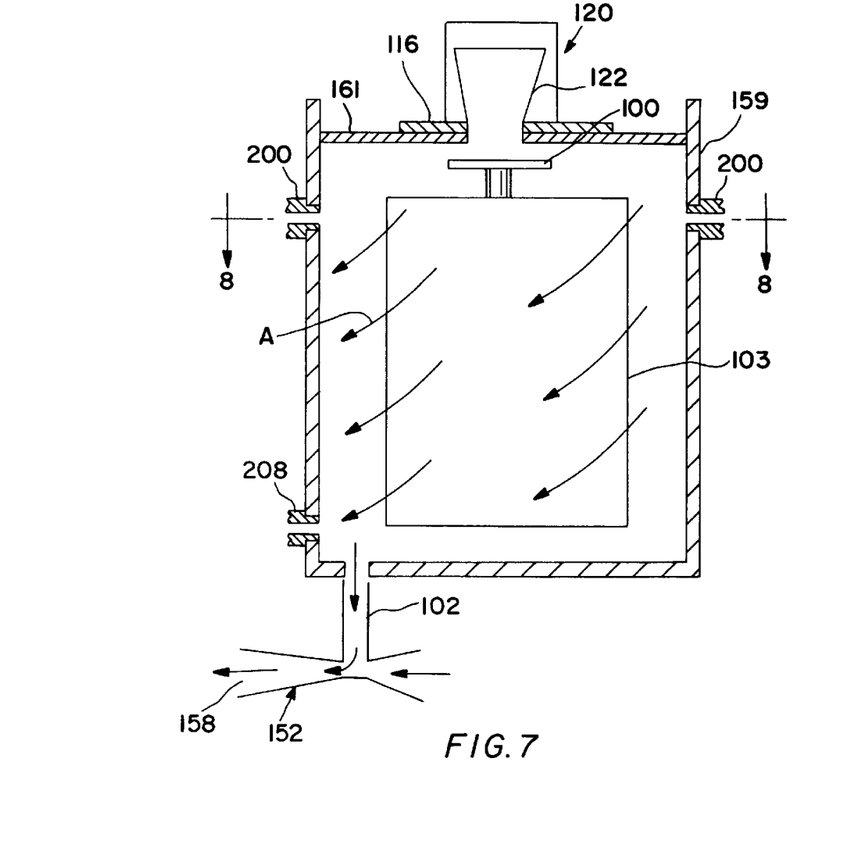
FIG. 7 is an elevation view of the pump of FIG. 4 enclosed within a sleeve with jets for adding electrolyte.
Figure 8:
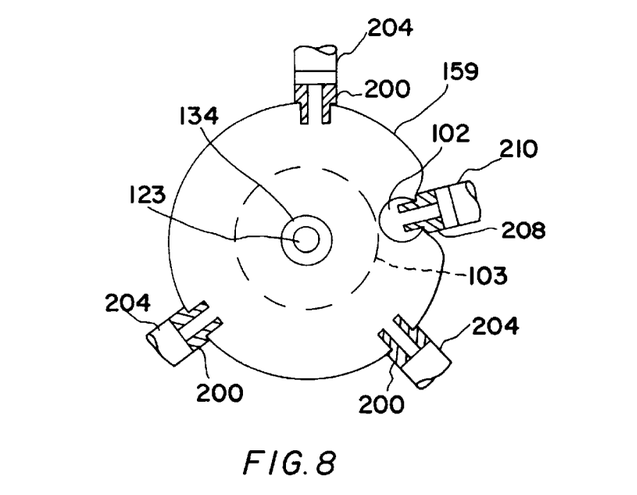
FIG. 8 shows a plan view taken along line 8—8 of FIG. 7.

FIGS. 7 and 8 show a way of increasing the output of the inventive small system which makes it competitive with conventional large systems presently costing in the order of four to six times more than this low cost system costs. In greater detail, the pump housing 103 is placed inside a sleeve housing 159 with the impeller 100 exposed within the housing. The weir 120 is mounted on an end plate 161 which closes the top of the sleeve housing 159. Therefore, when the dry polymer is dropped through funnel 122, it falls on the impeller 100 with approximately the same effect that occurs in the structure of FIG. 4.

The difference is that, in FIG. 4, the water escapes down pipe 150. In FIG. 7, the water simply pours over the motor 103 and passes down the space between the outer surface of the housing of motor 103 and the inner surface of the sleeve 159. This pouring water swirls under the influence of impeller 100, as indicated by arrows, such as A.

A number of suitable holes are drilled or otherwise formed in the sleeve housing 159 and around the periphery thereof. These holes give access into the mixture of polymer and electrolyte at a level which is after the initial mixture by the impeller 100. These holes have no adverse effect upon the hermetic seal of the motor.

I have found that three holes (FIG. 8) equally spaced around the circumference of the pump housing with fittings installed therein are usually adequate for most polymer processing systems. However, it should be understood that more or less holes and fittings may be provided according to the needs of any particular system.

A fitting 200 is installed in each drilled hole with a suitable sealant or packing to prevent dripping or the like. In many cases, the inside hole is threaded. The fitting may be a simple pipe having threads on its external wall which are turned into the threaded hole. In other cases, especially where the sleeve housing 159 wall is thin, a nut (not shown) may be provided inside the housing to attach and hold the threaded pipe and the jet in place. An O-ring, gasket or other suitable sealing means (not shown) may be positioned between the nut and the sleeve housing 159 wall to retain the leakproof construction. Outside the sleeve housing, a suitable hose 204 (FIG. 8) is attached to each fitting in order to supply the liquid electrolyte which is introduced into the sleeve housing chamber, below the level of the impeller 100. The amount of electrolyte flowing through each fitting may be controlled by suitable valves (not shown).

The fittings may be simply arranged to direct the jet stream radially into the chamber. However, it is recognized that sometimes, the fittings may be oriented to swirl or otherwise cause turbulence in the inflowing electrolyte.

At the bottom of the sleeve housing 159, another fitting 208 may be installed in either the sleeve housing or the discharge pipe 102, itself. The cross section drawing (FIG. 8) of sleeve housing 159 has been shown broken away so that the fitting 208 may be seen. A hose 210 is coupled to supply an electrolyte through the fitting 208 which enters at this point and mixes with and mixes with the polymer and electrolyte going down the drain 102. The effect of the electrolyte introduced by this fitting is to give an outflow which has a more uniform mixture and to reduce the possibility that the outflowing stream of processed polymer sometimes might be thicker and sometimes thinner.

The eductor 152 has a venturi which is designed to draw the processed polymer out of the discharge pipe 102. When the fittings 200, 208 are used, a larger eductor is provided to handle the extra electrolyte liquid. The eductor is "larger" as compared to the size of the eductor that is used without the fittings 200, 208.

After the discharge from eductor port 158, the processed polymer is further processed by any suitable and conventional method, as may be required. One suitable method for further processing might be somewhat as shown in FIG. 6 of my U.S. Pat. No. 5,407,975. One primary difference between the invention and the processing system shown in FIG. 6 of the patent is the manner in which the patent system uses its eductor 134. In the patent, the eductor 134 is connected with the low pressure port drawing off surplus water at the top 44 of the bowl 34. In the present invention (FIG. 4), the low pressure eductor port is connected to draw the processed polymer from pipe 102.

Figure 6:
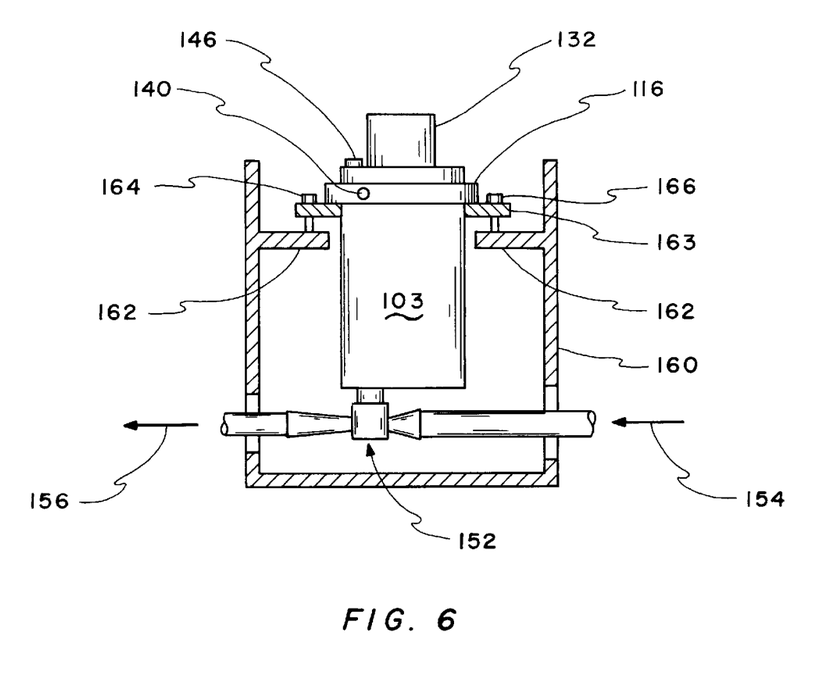
FIG. 6 is a cross-sectional view showing a housing for leveling the weir.

The entire submersible pump housing 103 (FIGS. 4 and 5) and perhaps sleeve housing 159 is preferably enclosed within an outer sleeve or housing 160 (FIG. 6) which protects it from mechanical damage and from contaminants, and which presents an attractive appearance. The sleeve or housing 160 preferably includes an inside shelf 162 having a central hole through which the submersible pump housing 103 or perhaps sleeve housing 159 slips. A support plate 163, having an outside diameter larger than the inside diameter of the hole in the inside shelf 162, is fitted under the collar 116 of the submersible pump. A suitable number of screws (such as 164, 166) extend through holes in support plate 163 and rest upon shelf 162. These screws may be turned to bring the bubble B (FIG. 4A) in level 147 under the target T etched on a window W in the level. When this adjustment is completed, the weir effect produces the desired unbroken curtain of water lining the interior of the funnel.

Of course, other structures may be provided for leveling the weir. The level has to be accurate enough to properly wet the inside wall of the funnel 122; however, minor variances from a perfect level can be tolerated as long as the electrolyte inside the sleeve rises high enough to overflow the circumference of edge 134 adequately to uniformly wet the funnel wall with an unbroken sheet of flowing water.

Those who are skilled in the art will readily perceive how to modify the invention. Therefore, the appended claims are to be construed to cover all equivalent structures which fall within the true scope and spirit of the invention.

The claimed invention is:

1. A dry polymer processing system comprising an inverted submersible pump in a sleeve housing having an impeller at the top of said inverted pump and a discharge at the bottom of said sleeve housing and a hermetically sealed motor housing coupled to drive said impeller, a weir mounted on top of said sleeve housing and above said impeller, said weir having an outer sleeve with a first upper edge and a funnel inside said outer sleeve, said funnel having a second upper edge which is lower than said first upper edge whereby a liquid electrolyte may raise in said outer sleeve to a level overflowing said second edge without overflowing said first edge, said funnel having a bottom opening leading into an eye of said impeller, means for substantially leveling at least said second upper edge of said weir to an extent that an inside wall surface of said funnel is covered by an unbroken sheet of said liquid electrolyte, means for introducing said liquid electrolyte into said outer sleeve to a level which overflows said second upper edge and into said funnel, means for depositing dry polymer through said funnel opening and into said eye of said impeller, and means for introducing more fresh liquid electrolyte into said sleeve housing at a level which is beneath said impeller.

2. The system of claim 1 and means for introducing still more fresh liquid electrolyte into a stream of said polymer and said electrolyte after leaving said introducing means and before it is discharged at the bottom of said sleeve housing.

3. The system of claim 1 and a collar interposed between said sleeve housing and said weir for preventing said liquid electrolyte from entering said impeller except through said funnel, said collar including a passageway for introducing said liquid electrolyte into said sleeve, said liquid electrolyte introduced via said passageway and overflowing said second edge being limited to an amount which does not hydraulically lock said impeller.

4. The system of claim 3 wherein said introducing means comprises at least one hole formed in said sleeve housing at a level below said collar and in communication with polymer and liquid electrolyte mixed by said impeller, and means for introducing said more fresh liquid electrolyte into said sleeve housing via said at least one hole.

5. The system of claim 4 wherein there are a plurality of said holes formed in said sleeve housing at points distributed uniformly around an outer periphery of said sleeve housing with said means for introducing said more fresh liquid electrolyte being connected to each of said plurality of said holes.

6. The system of claim 5 further comprising a fitting means for introducing said still more fresh electrolyte into said discharge at the bottom of said sleeve housing, and an eductor including a venturi coupled to draw a mixture of said polymer and said electrolyte from said discharge.

7. A dry polymer processing system comprising a weir having an outer sleeve with a funnel mounted coaxially therein and supported on a base plate, said base plate being mounted on a housing containing a hermetically sealed pump, means for adjustably mounting said weir in a substantially vertical position with an upper edge of said funnel being substantially level with respect to gravity so that a liquid in said outer sleeve overflows around a periphery of said upper edge of said funnel and completely wets the inner surface of said funnel, said housing terminating in a seat with a collar interposed between said base plate and said seat so that said base plate and collar are attached to said housing with said weir in an upright position with respect to gravity, said collar having a passageway therein for introducing said liquid into said outer sleeve while preventing said liquid from leaving said outer sleeve except via said overflow into funnel, a plurality of holes formed around a periphery of said housing at a level which is below said seat, said holes providing a means for introducing a liquid through said holes and into a part of said housing including an impeller, means for introducing dry polymer through said funnel and into said part of said housing including said impeller, and means for draining a mixture of said liquid and said polymer from said housing after said liquid has wetted said dry polymer.

8. The system of claim 7 wherein said means for draining said housing comprises an eductor coupled to a port communicating with an interior of said housing for discharging said mixture of wetted polymer from said housing.

9. The system of claim 8 and means near said port for introducing fresh liquid into said mixture of wetted polymer after it leaves said part of said housing and before it reaches said eductor.

10. A weir-pump combination for processing polymer, said combination comprising a housing having a chamber containing a pump having an impeller, a hermetically sealed motor coupled to turn said impeller and to prevent substantially any transfer of liquid or moisture from said chamber and into said motor;

a drain extending from said housing;

a weir on top of said housing at a location above said impeller in said chamber, said weir comprising a tubular member opening into an eye of said impeller, an upper edge of said tubular member being substantially level relative to gravity;

means for raising said liquid surrounding said tubular member to a height where said liquid overflows said upper edge and passes downwardly in an unbroken sheet of water covering an inner wall of said tubular member;

means for dropping polymer down said tubular member while covered by said unbroken sheet of water and into said eye of said impeller;

jet means for introducing more of said liquid into said chamber at a level below said impeller, the overflow of said liquid being independent of said more liquid, the total amount of liquid introduced into said chamber being limited so that said impeller is not hydraulically locked;

means for drawing a mixture of said liquid overflowing said upper edge, said liquid introduced by said jets, and said dry polymer through said drain and out said bottom of said housing.

11. The combination of claim 10 and means at bottom of said housing drain and before said drawing means for introducing fresh liquid into said mixture.

12. The combination of claim 11 wherein said weir comprises a coaxial pair of tubes with said tubular member being an inner one of said pair of tubes, an outer one of said pair of tubes raising to a height which contains said liquid while it is overflowing said upper edge of said tubular member.

13. The combination of claim 12 wherein said mixture drawing means is an eductor coupled to the drain of said housing for drawing said mixture from said compartment.

14. A mechanical assembly for a dry polymer processing system, said assembly comprising a pump within a leak-proof housing containing an impeller at the top of said pump, said pump having a motor hermetically sealed therein, said housing providing a liquid flow path between said pump and an inside wall of said housing, a discharge opening at the bottom of said housing, a weir mounted on top of said housing and above said impeller, said weir having an outer sleeve and an inner funnel mounted coaxially on a base plate, said funnel having an opening leading into an eye of said impeller, means for substantially leveling a top edge of said funnel, means for introducing a liquid into said outer sleeve, said sleeve raising to a height which is higher than said top edge of said funnel so that said liquid rising in said sleeve overflows into said funnel, said liquid overflowing said top edge being limited to an amount which does not hydraulically lock said impeller, means for introducing fresh liquid into a space within said housing and under said impeller, means for depositing dry polymer into said funnel for conveyance into said eye of said impeller, an eductor coupled to a bottom of said discharge opening, said eductor including a venturi coupled to draw a mixture of said polymer and said liquid from said discharge opening, means for introducing a fresh amount of said liquid into said mixture after it leaves said space within said housing and before it reaches said eductor, and means for adjusting a position of said top edge of said funnel to insure a substantially uniform overflow around an upper periphery of said funnel.

* * * * *